Sept. 26, 1961

M. C. EANS, JR., ET AL 3,001,556

AUTOMATIC GRID MAKING MACHINE

Filed Dec. 16, 1957

INVENTORS:
MARVIN C. EANS JR.,
JUNIUS B. NEALE,

BY *Nathan J Crawford*
THEIR ATTORNEY.

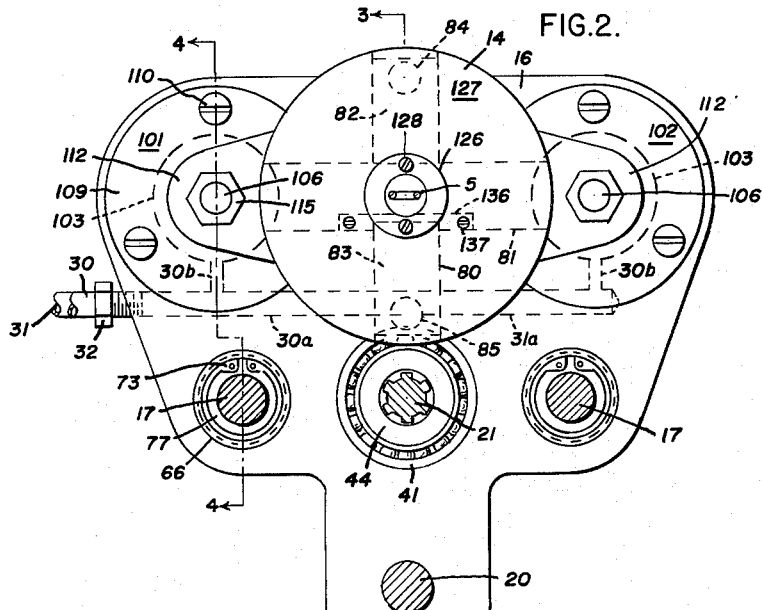
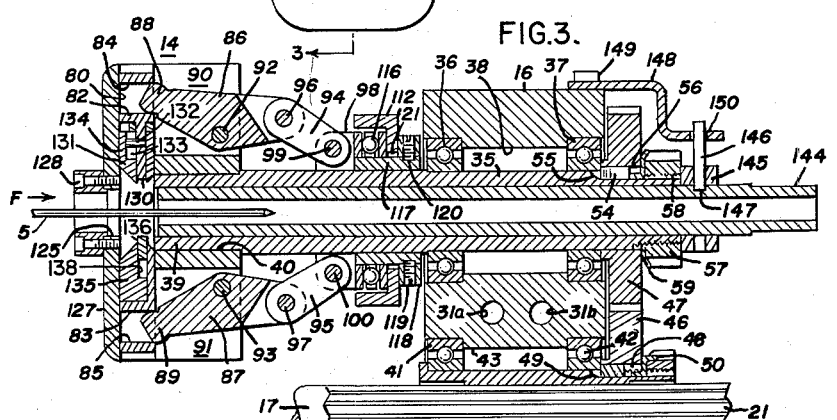
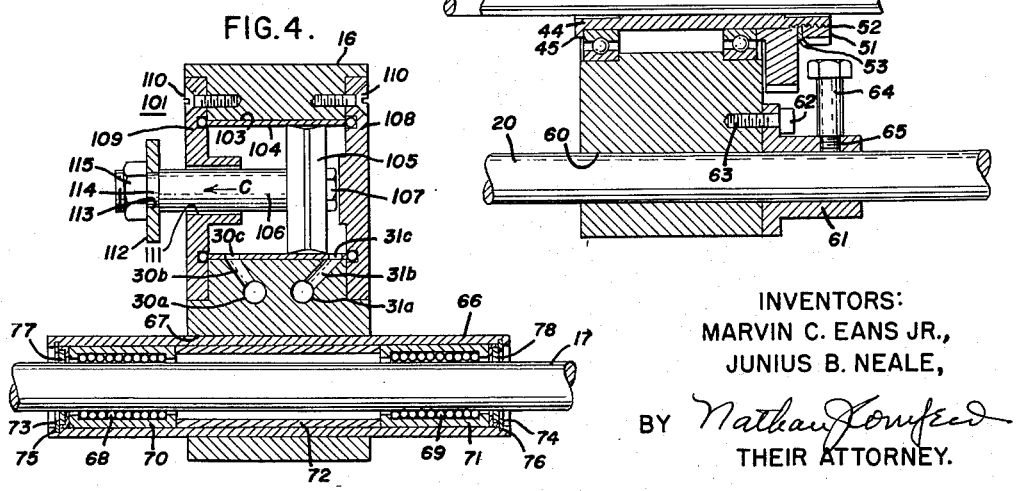

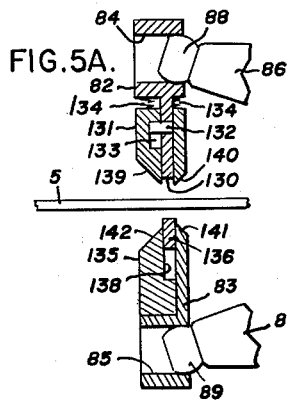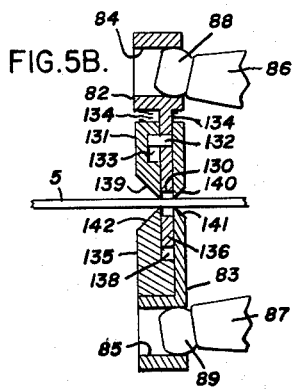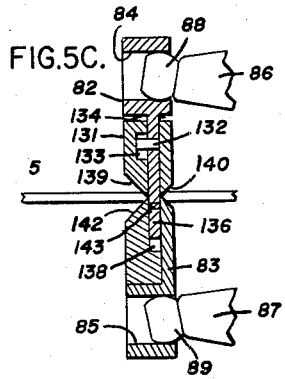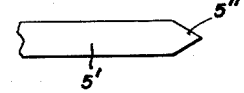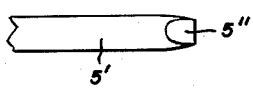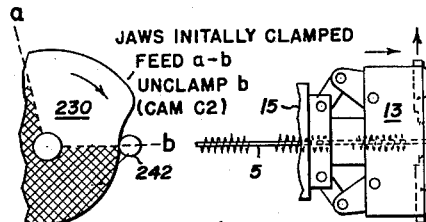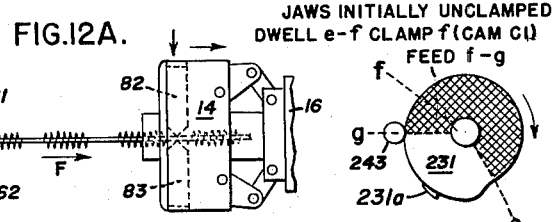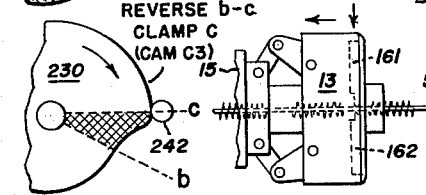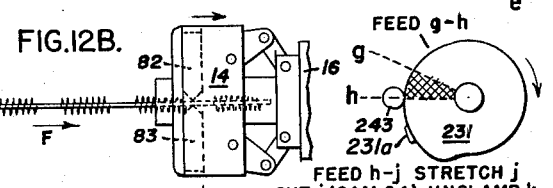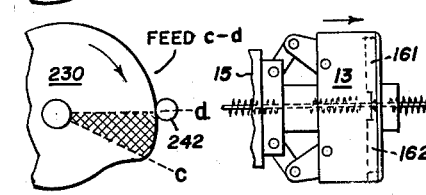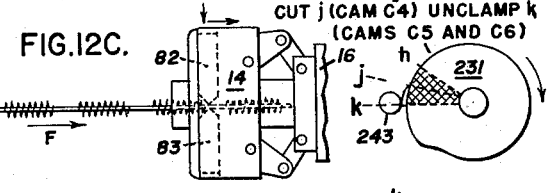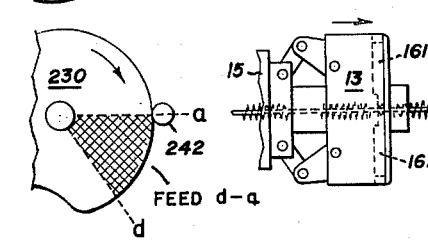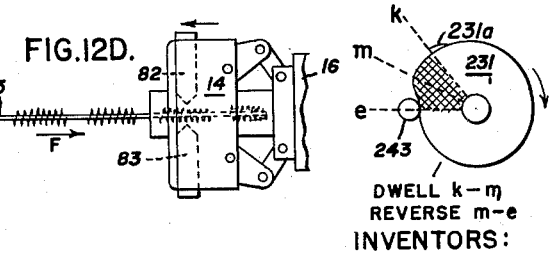

Sept. 26, 1961     M. C. EANS, JR., ET AL     3,001,556
AUTOMATIC GRID MAKING MACHINE
Filed Dec. 16, 1957     6 Sheets-Sheet 4
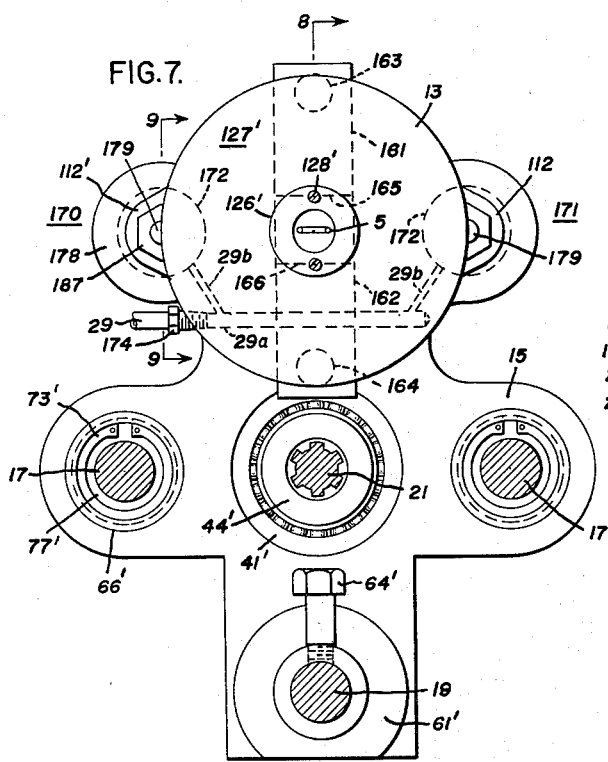
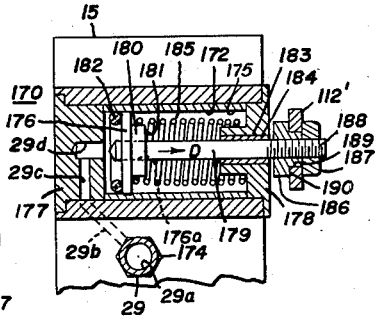
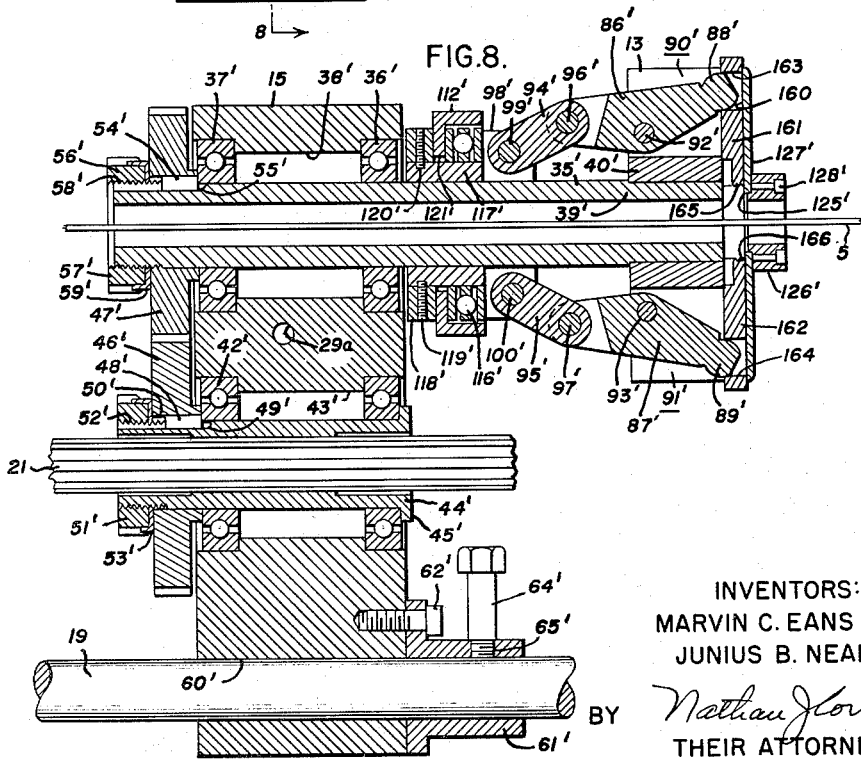
INVENTORS:
MARVIN C. EANS JR.,
JUNIUS B. NEALE,
BY *Nathan Kornfeld*
THEIR ATTORNEY.

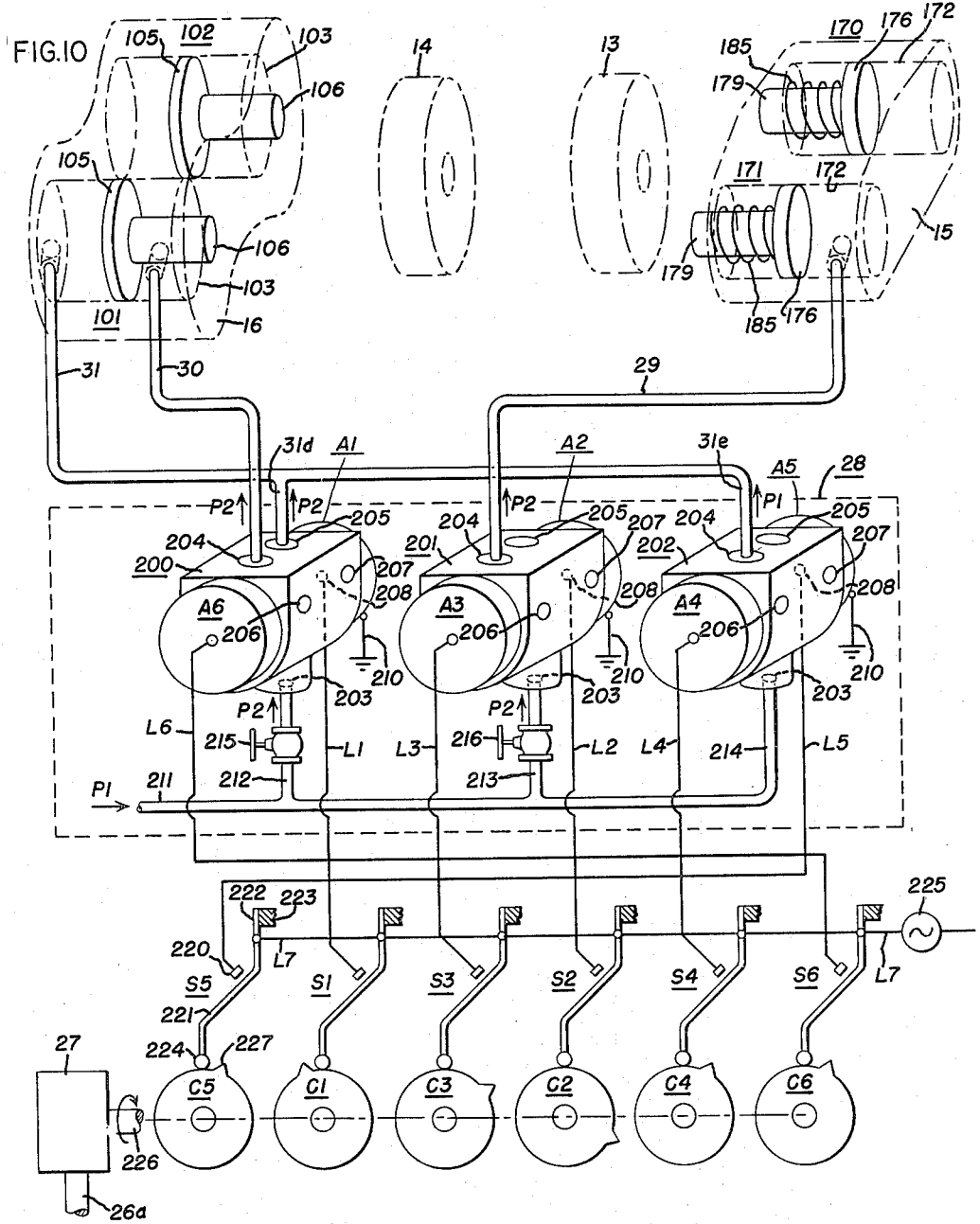

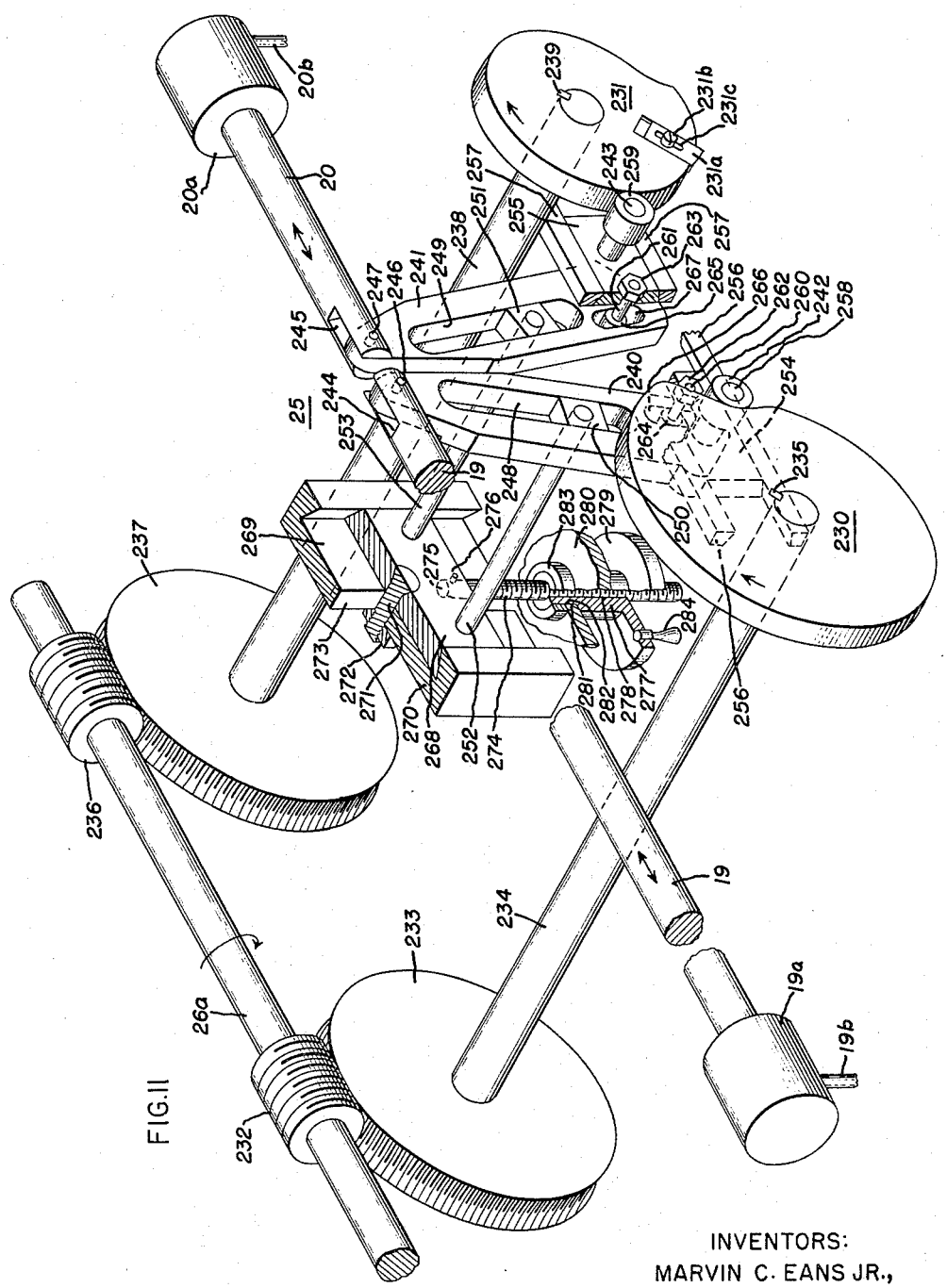

United States Patent Office 3,001,556
Patented Sept. 26, 1961

3,001,556
AUTOMATIC GRID MAKING MACHINE
Marvin C. Eans, Jr., and Junius B. Neale, Owensboro, Ky., assignors to General Electric Company, a corporation of New York
Filed Dec. 16, 1957, Ser. No. 702,945
10 Claims. (Cl. 140—71.5)

This invention relates to automatic machines for making grid electrodes of the type commonly used in electron discharge tubes, and more particularly to automatic feeding means for such machines. Grid electrodes of this type consist of one or more parallel support rods having a helix of a number of turns of relatively fine wire wound thereon and secured thereto at each point of contact.

Machines for making grid electrodes of this type generally comprise means for forming a series of notches in support rods, means for winding a helix of relatively fine wire about the support rods so that the turns of wire lie in successive notches, and means for peening the metal of the support rods so as to close the notches over the fine wires lying therein, thereby securing the wire helix to the support rods to maintain the assembled relation of the elements of the completed grid. A machine of this general type is shown in U.S. Patent No. 1,838,819 to Flaws, Jr., assigned to the same assignee as the present application. It is customary to provide means for rotating and longitudinally feeding the support wires during the operations of the grid-making machine, in order to wind the fine wire about the support rods in a helical form. The rate of longitudinal feed of the support wires in relation to the rate of rotation determines the number of turns of fine wire made on a given length of support rod, and thus determines the form of the finished grid electrode.

It is customary practice to manufacture grid electrodes on such machines in the form of continuous strips, by winding helices of fine wire successively on support rods of indefinite length, which are fed from supply reels by continuous feeding means. Following the winding operations, successive grid electrodes are cut off by suitable knives of dies operated in conjunction with the grid-making machine, and appropriately timed to cut the support rods between successive helices.

Grid electrodes produced by grid-making machines of this type are frequently produced with twisted or warped side rods, because of residual stresses set up during the notching, winding, and peening operations, or by other causes. It is generally necessary to perform a grid-stretching operation in order to eliminate this distortion and produce grid electrodes having straight support rods.

In order to automatically produce completed grid electrodes which are of uniform quality and correct form, and to do so continuously, it is necessary to provide feeding means, severing means, and stretching means, which will operate in correctly correlated and timed sequence, and which will do so automatically and continuously.

It is the object of this invention to provide combination continuous grid electrode feeding means, severing means, and stretching means of improved construction, which comprises a novel combination of elements cooperating to achieve the aforementioned functions uniformly, automatically, and with improved reliability of operation.

Further objects and advantages of this invention will become apparent from the following description, reference being had to the accompanying drawings, and the features of novelty which characterize the invention will be pointed out in the claims.

Briefly stated, in accordance with one aspect of this invention, there are provided combination continuous feeding, severing, and stretching means for grid electrodes formed on a grid-making machine, including a pair of grid strip-receiving clamping heads which are rotatably and reciprocably mounted on the bed of a grid-making machine. The clamping heads are rotatable on a common axis, and carry grid clamping jaws which are slidable radially, relative to the axis of rotation, to clamp the support rods of a grid electrode strip rotated on the same axis by other elements of the grid-making machine. These jaws are actuable by suitable motors controlled by electric circuit means including cam-actuated rotary electric switches. The jaws of one of the clamping heads are further actuable to exert sufficient pressure on the support rods to sever them. The clamping heads are reciprocable along their common axis by cam-controlled means, in a program synchronized with the grid-forming operations of the grid-making machine and with the clamping and severing operations of the clamping jaws. Synchronization is achieved through the use of common driving means to actuate all of the elements of the grid-making machine. The program of operation is such that a uniform feeding of the support rods to the grid-making machine is maintained, by alternative and overlapping reciprocation of the heads, and by clamping of the jaws associated with each head only during its motion in a feeding direction. The program of operation also includes an interlude of motion of both clamping heads in the same direction and at different speeds, to produce a stretching of the grid electrode strip prior to a severing operation. At the conclusion of this stretching operation, the clamping jaws of one of the heads are actuated to sever a completed grid from the grid electrode strip.

For a better understanding of this invention, reference may be had to the accompanying drawings, in which:

FIG. 2 is an end view of a first one of the clamping heads of the invention, together with fragmentary portions of the grid-making machine cooperating therewith.

FIG. 3 is a sectional elevation of the clamping head of FIG. 2, taken along the line 3—3 in FIG. 2, looking in the direction of the arrows.

FIG. 4 is a sectional elevation of the clamping head of FIG. 2, taken along the line 4—4 in FIG. 2, looking in the direction of the arrows.

Figure 1:
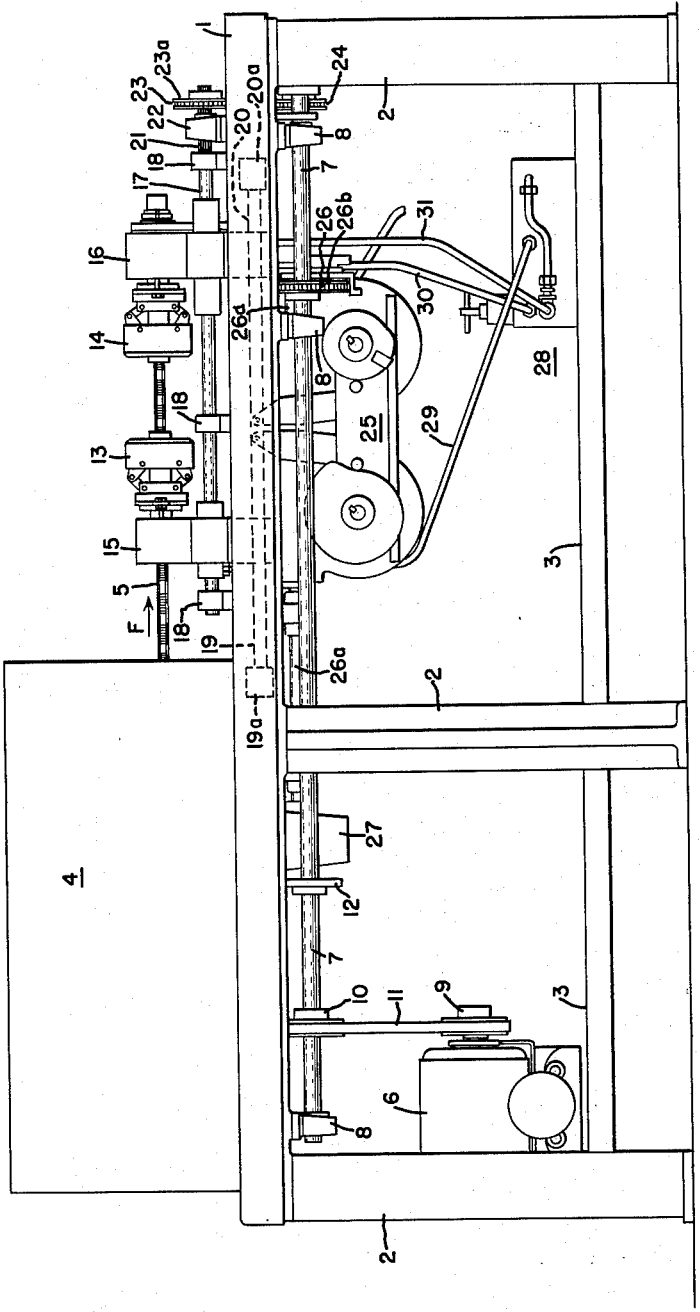
FIG. 1 is an elevation of portions of a grid-making machine embodying one form of the invention.

FIGURES 5A, 5B, and 5C represent a fragmentary portion of the first clamping head as seen in FIG. 3, together with a fragmentary portion of a grid electrode strip, showing three operational positions of the clamping jaws of that clamping head relative to the grid electrode, namely including: the clamping jaws open, in clamping position on the grid electrode, and severing the grid electrode.

FIGURES 6A and 6B are enlarged elevation and plan views, respectively, of a support rod of a grid electrode severed by the clamping jaws of FIGURES 5A, 5B, and 5C.

FIG. 7 is an end view of the second clamping head of the invention, together with fragmentary portions of the machine cooperating therewith.

FIG. 8 is a sectional elevation of the clamping head of FIG. 7, taken along the line 8—8 in FIG. 7, looking in the direction of the arrows.

FIG. 9 is a fragmentary elevation, partially in section, of the clamping head of FIG. 7, taken along the line 9—9 in FIG. 7, looking in the direction of the arrows.

FIG. 10 is a schematic diagram of air supply means for actuating the clamping jaws of the invention, together with electric circuit control means therefor.

FIG. 11 is a fragmentary pictorial view of cam-controlled means for reciprocating the clamping heads of the invention, referred to herein as a motion-box.

FIGURES 12A, 12B, 12C, and 12D are diagrammatic representations of the program of motion of the clamping heads and operation of the clamping jaws, showing four operational positions, correlated with the operational positions of the cam-controlled means of FIG. 11.

Referring to FIG. 1, there are shown portions of a grid-making machine embodying this invention. Although only a single specific embodiment is shown, it is to be understood that the grid-making machine may assume any modified form suitable for specific applications, as will be understood by those skilled in the art. A bed plate 1 for supporting the elements of the grid-making machine is mounted on legs 2 formed integrally therewith, and the structure is stiffened by means of structural members 3. Grid-making devices of conventional type, generally designated 4, are mounted along a portion of bed plate 3. This mechanism is not shown, as it forms no part of the present invention; but it may be of any conventional construction suitable for the formation of a continuous strip of grid electrodes of indefinite length, of the type comprising parallel support rods having a helix of relatively fine wire wound thereon. An example of such a grid-making device is shown by U.S. Patent No. 1,838,819 to Flaws, Jr., previously referred to. A grid electrode strip 5 having two parallel support rods of indefinite length, produced by the grid-making devices 4, is shown in a position to be fed in the direction of arrow F by the feeding means of the present invention. The present embodiment of the invention is adapted for use with a grid electrode strip having two parallel support rods, but it will be obvious to those skilled in the art that modifications may be readily made to accommodate grid electrode strips having a different number of parallel support rods.

A suitable motor 6 for driving the elements of the grid-making machine is provided, and is mounted on one of the supporting legs 2 of the grid-making machine; this motor is supplied with electric power and controlled by any suitable means (not shown). A drive shaft 7 is provided to transmit power from motor 6 to the elements of the grid-making machine, and is mounted in suitable bearing supports 8, affixed at spaced points along shaft 7 to bed plate 1. Driving torque is transmitted from motor 6 to drive shaft 7 by means of sheaves 9, 10, affixed to the shaft of motor 6 and to drive shaft 7 respectively, and drivingly connected by a belt 11. Power for driving the grid-making devices 4 is taken off drive shaft 7 by means of a sprocket 12 which may be drivingly connected to these devices by any suitable means, such as a chain drive (not shown).

The grid electrode feeding, stretching, and severing functions of the apparatus of this invention are achieved by means of a pair of clamping heads generally indicated at 13 and 14. These clamping heads are rotatably mounted in bearing housings 15 and 16, respectively. Housings 15 and 16 are slidably mounted on parallel spaced-apart slide bars 17, for reciprocation of clamping heads 13 and 14 along the longitudinal dimension of grid electrode strip 5. Slide bars 17 are supported in fixed relation to bed plate 1 by means of arms 18 suitably secured to the bed plate. In order to effect reciprocation of clamping heads 13 and 14, housings 15 and 16 are respectively affixed to a pair of push rods 19 and 20. A pair of pneumatic dash-pots 19a and 20a are mounted on bed plate 1 and affixed to push-rods 19 and 20 respectively. The function and operation of these dash-pots will be more fully described in connection with FIG. 11.

In the formation of grid electrode strip 5, it is rotated by grid-making devices 4. Clamping heads 13 and 14 are rotated in synchronism with the grid electrode strip to maintain a predetermined relationship between these elements for proper operation of the clamping heads on the grid electrode strip. Synchronized rotation of the clamping heads is produced by a spline shaft 21 mounted rotatively on bed plate 1 by means of bearing blocks 22, of which only one is shown in FIG. 1. Spline shaft 21 is rotated from drive shaft 7 by means of sprocket 23 affixed to the spline shaft and sprocket 24 affixed to drive shaft 7, these sprockets being positively drivingly connected by a chain 23a.

Reciprocation of clamping heads 13 and 14 by push-rods 19 and 20 is achieved by means of a cam-controlled motion-box, generally designated at 25. Means are provided for driving the motion-box, including a drive sprocket 26 affixed to drive shaft 7, which positively drives a jack shaft 26a by any suitable means, such as a chain drive 26b. Jack shaft 26a is drivingly connected with motion-box 25, which will be described in detail in connection with FIG. 11.

In order to control the clamping operations of clamping heads 13 and 14 in synchronism with the other operations of the machine, additional driving means are generally shown in FIG. 1. Jack shaft 26a, driving motion-box 25, additionally positively drives a speed reducer 27 of any suitable construction.

Compressed air supply means for providing power for the clamping operations are generally shown at 28, and are connected with housing 15 by means of conduit 29, and with housing 16 by means of conduits 30 and 31. The operation and function of these devices will be more fully explained in connection with FIG. 10.

The preceding generalized description has been given merely to indicate the general relationship of the elements of the grid-making machine, in order that the detailed descriptions of the various elements and their cooperation which follow may be more clearly understood.

Clamping and cutting head

Referring to FIGURES 2, 3 and 4, a first one of the clamping heads 14 and its associated housing 16 are shown in detail. In order to support head 14 in housing 16 rotatably, a hollow spindle 35 is mounted in ball bearings 36 and 37, the outer races of which are received within an enlarged bore 38 formed in housing 16. An end portion 39 of hollow spindle 35 is received with a force fit within a bore 40 formed in clamping head 14, so that these elements are secured together.

Spline shaft 21 is supported for rotation in housing 16 by means of ball bearings 41 and 42, seated in a bore 43 formed in housing 16. In order to transmit the driving torque of spline shaft 21 and to support it for rotation in bearings 41 and 42, an internally-splined collar 44 is placed about spline shaft 21, in torque-transmitting engagement therewith. Collar 44 is slidingly received by the inner races of ball bearings 41 and 42, and is provided with an annular flange 45 to assist in restraining collar 44 from slipping axially out of engagement with the bearings.

Driving torque is transmitted from spline shaft 21 to clamping head 14 by means of a gear train comprising intermeshing gears 46 and 47. Gear 46 is received in sliding engagement about the outer periphery of collar 44, and is held in torque-transmitting relationship therewith by means of a key 48 inserted in keyways 49 and 50, formed in collar 44 and gear 46, respectively. Axial movement of gear 46 and collar 44 along spline shaft 21 is prevented by means of a castellated nut 51, which is threaded on an external thread 52 formed about an end of collar 44. A castellated lock washer 53 is inserted under castellated nut 51, and its castellations are bent into engagement with keyway 49 and with the castellations of nut 51, to prevent accidental unscrewing of nut 51 from threads 52 after assembly.

Gear 47 is secured to hollow spindle 35 for transmission of rotary motion in the same manner as gear 46 is secured to spline shaft 21. A key 54 is placed in a keyway 55 formed in the periphery of an end portion of spindle 35 and in a keyway 56 formed in gear 47, so as to transmit rotary motion therebetween. In order to secure the assembly, a castellated nut 57 is screwed on a thread 58 formed about the periphery of an end portion of hollow spindle 35. A castellated lock washer 59 is placed under nut 57 on spindle 35, and its castellations are bent into engagement with keyway 55 and with the castellations of nut 57, thus preventing relative unscrewing motion of nut 57 and collar 35, after assembly of the parts. By the means just described, rotary motion of spline shaft 21 is transmitted to clamping head 14.

For transmitting reciprocal motion to clamping head 14 and housing 16, push-rod 20 is received within a bore 60 formed in head 16, and is secured by means of a collar 61. This collar is slidingly received about push-rod 20 and secured to housing 16 by means of machine screws 62, only one of which is shown, threaded in tapped holes 63 formed in housing 16. Housing 16 and collar 61 are secured in a desired position along push-rod 20 by means of a bolt 64, threaded into clamping engagement against the periphery of the push-rod through a tapped hole 65 radially formed in the collar.

As previously stated, housing 16 and clamping head 14 are supported in longitudinally slidable relationship on bed plate 1 by means of a pair of slide bars 17. In order to restrain canting of housing 16 on slide bars 17, housing 16 is mounted thereon by means of elongated sleeves 66 received in force-fit relationship within bores 67 formed in the housing. Each sleeve 66 is supported in sliding engagement on one of slide bars 17 by means of a pair of spaced apart wire coils 68 and 69, secured in fixed relation thereto by means of cages 70 and 71, respectively. This arrangement insures a minimum of sliding friction. Cages 70 and 71 are secured in spaced relation within each sleeve 66 by means of a spacer sleeve 72 disposed in sleeve 66 between the cages, and are prevented from sliding out of the ends of the sleeve by means of snap rings 73 and 74, which are seated in grooves 75 and 76, respectively, formed at opposite ends of the inner surface of the sleeve. A supply of lubricant may be placed within sleeve 66 and sealed therein by means of oil seals 77 and 78, interposed between cages 70 and 71, respectively, and their associated snap rings.

Referring again to FIGURES 2 and 3, clamping head 14 is formed with diametral slots 80 and 81, formed at right angles. Slot 80 receives a pair of clamping jaws 82 and 83 in radially slidable engagement therewith. To provide for actuation of jaws 82 and 83, circular openings 84 and 85 are formed near their respective outer extremities.

Sliding actuation of jaws 82 and 83 in slot 80 is achieved through the medium of toggle levers 86 and 87, which are formed at one end, respectively, with ball joints 88 and 89, cooperating in rocking engagement with openings 84 and 85. Head 14 is formed with suitable recesses 90 and 91 for receiving toggle levers 86 and 87, respectively. Lever 86 is mounted for pivotal motion by means of a pin 92 passed transversely through head 14, so that lever 86 may be rocked in a plane radial to the axis of the head to produce radial sliding of jaw 82. Similarly, lever 87 is pivoted by means of a pin 93 passed transversely through head 14, and is rockable in a radial plane to slide jaw 83 radially. The toggle linkages are completed by links 94 and 95, which are rotatably linked to levers 86 and 87 by means of pins 96 and 97, respectively. Actuation of the toggle linkages is achieved by means of a split collar 98, which comprises a two-part annulus slidable axially on the outer surface of spindle 35, and rotatable therewith. The two-part annulus of collar 98 is secured as an integral collar by means of transverse pins 99 and 100, transfixing each half of the annulus and suitably secured thereto. Toggle links 94 and 95 are pivotally mounted on pins 99 and 100, respectively. By means of the toggle linkage just described, axial movement of collar 98 along spindle 35 produces radial sliding of jaws 82 and 83 in recess 80 of clamping head 14.

Referring to FIG. 2, a pair of hydraulic motors generally designated 101 and 102 are stationarily mounted in housing 16 for operation of the clamping jaws 82 and 83. One of these motors 101 is seen in detail in FIG. 4. Motor 102 is of identical construction. Motor 101 generally comprises a cylinder 103 formed in housing 16, a cylinder liner 104 received within cylinder 103, a piston 105 slidable within cylinder 104, and a piston rod 106. Piston rod 106 is secured to piston 105 by any suitable means, such as a bolt 107, passing through the piston and threaded into the piston rod. Cylinder 103 is sealed at both ends by means of cylinder heads 108 and 109, secured to housing 16 by means of machine screws 110. Cylinder head 109 is formed with a bore 111 slidably receiving piston rod 106, to seal cylinder 103.

Referring again to FIG. 2, conduits 30 and 31 are secured to housing 16 by means of standard fittings 32. These conduits supply compressed air for operation of motors 101 and 102. Each of the conduits supplies each of the motors 101 and 102; for this purpose, a conduit 30a and branch conduits 30b are formed in housing 16 in communication with conduit 30, and a similar conduit 31a and branch conduits 31b are provided to communicate conduit 31 with motors 101 and 102. Referring again to FIG. 4, conduits 30a and 31a connect with opposite ends of cylinder 103 through branch conduits 30b and 31b, and through openings 30c and 31c, respectively, formed in cylinder liner 104. In this manner, conduits 30 and 31 are connected to opposite ends of each of the motors 101 and 102, so that supply of compressed air to conduit 31 serves to operate motors 101 and 102 in unison in the direction of the arrow C, and supply of compressed air to conduit 30 operates the motors in a reverse direction.

Motors 101 and 102 are connected for joint actuation of collar 98 by means of a yoke 112. Yoke 112 is formed with openings 113 (FIG. 4) at either end thereof, receiving necked-down portions 114 of piston rods 106. Piston rods 106 are secured to yoke 112 by means of nuts 115 threaded on necked-down portions 114 and clamped against the surface of yoke 112. By these means, yoke 112 may be reciprocated along the axis of rotation of clamping head 14.

Referring again to FIG. 3, means are provided to transmit the axial motion of non-rotating yoke 112 into axial motion of rotating collar 98. These means comprise a bearing assembly 116, which is axially interposed between yoke 112 and collar 98, so as to transmit axial motion therebetween while permitting relative rotation thereof. Axial motion of yoke 112 away from collar 98 is transmitted by means of an annular extension 117 formed integrally with collar 98, in cooperation with a ring 118 slidably received thereon and abutting a reverse face of yoke 112. Ring 118 is secured to annular extension 117 by means of set screws 119, radially threaded therethrough and cooperating in clamping engagement with an annular groove 120 formed in the periphery of annular extension 117. Yoke 112 is formed with an aperture 121, receiving annular extension 117 therethrough for relative rotation.

In order to receive grid electrode strip 5 along its axis of rotation, clamping head 14 is formed with a circular opening 125. A guide collar 126, of annular form, is placed about this opening and in axial abutment against a plane face 127 of clamping head 14, and is secured to clamping head 14 by means of a plurality of machine screws 128. Grid electrode strip 5 is passed through guide collar 126, opening 125, and into spindle 35 of clamping head 14, passing through the axis of rotation of the clamping head in a position to be clamped by radial motion of jaws 82 and 83 toward this axis.

As will be apparent from the preceding description, motors 101 and 102 may be actuated by compressed air supplied to conduit 31 to clamp jaws 82 and 83 on the grid electrode strip with a force varying with the pressure of the compressed air supplied thereto, and may be actuated by compressed air supplied to conduit 30 to unclamp the jaws. Jaw 82 is formed with a leading edge 130 which comprises a shearing die. Jaw 82 carries with it a forming die 131 which cooperates in sliding engagement therewith by means of a pin 132 affixed to jaw 82, sliding in groove 133 formed interiorly in the forming die. Thus, die 131 may slide to a limited extent radially relative to jaw 82. Compression springs 134 are located between die 131 and jaw 82 in a position to resiliently bias the die radially inwardly along slide 80, relative to jaw 82.

Jaw 83 also comprises a forming die, and cooperates with an additional forming die 135, affixed thereto by brazing or any other suitable means.

A stationary stripper bar 136 acts in cooperation with the jaws and dies just described, and is mounted in diametral recess 81 by means of screws 37 threaded into the body of clamping head 14, as best shown in FIG. 2. Referring again to FIG. 3, forming die 135 is formed with a recess 138 to permit radial motion of stripper bar 136 relative thereto.

Having described the clamping jaws and the means for their operation, the clamping and severing operations of the jaws on grid electrode strip 5 will now be described, with reference to FIGURES 5A, 5B, and 5C. In FIG. 5A the jaws and associated dies are shown in an open position, together with fragmentary portions of toggle levers 86 and 87. It will be noted that forming die 131 is formed with chisel edges 139 and 140, and that jaw 83 and forming die 135 are formed with chisel edges 141 and 142, respectively.

If compressed air is supplied to conduit 31, jaws 82 and 83 are actuated radially inwardly by toggle levers 86 and 87 toward the position of FIG. 5B. The chisel edges of the jaws initially engage the support rods of grid electrode strip 5, and mutually clamp the support rods against axial motion relative thereto. Further motion of jaws 82 and 83 into grid strip 5 is resisted by the support rods, acting directly through jaw 83 and die 135 upon ball joint 89, and acting through the medium of die 131, compression springs 134, and jaw 82 upon ball joint 88. The chisel edges of the dies and of jaw 83 insure that only a relatively slight force is required to indent the support rods of grid electrode strip 5 to secure a clamping action.

If the pressure of air supplied to conduit 31 is now increased, an increased force is exerted upon jaws 82 and 83 by means of toggle levers 86 and 87, and the parts are actuated to the severing position shown in FIG. 5C. Chisel edges 139, 140, 141 and 142 cut into the support rods of grid electrode strip 5, and serve to produce chiseled ends on each support rod of the grid electrode strip severed by the operation. As the pressure increases to a value sufficient to compress springs 134 fully, jaw 82 continues to move inwardly relative to die 131, pin 132 moving radially inwardly in slot 133. During this event, severing edge 130 of jaw 82 passes through the support rods of the grid electrode strip, severing them. A chip of material 143 is carried by cutting edge 130 into contact with stripper bar 136.

Following the severing operation, the jaws and dies may be returned to the position of FIG. 5A by supplying compressed air to conduit 30, and stopping the supply to conduit 31. Chip 143 remains atop stripper bar 136, in a position for removal from the jaws.

FIGURES 6A and 6B are representations, in elevation and plan views respectively, of a support rod 5' of grid electrode strip 5, after the severing operation. The support rod 5' is formed with a sharpened chisel point 5'', by the action of chisel edges 139, 140, 141, and 142. A chisel point of this type greatly facilitates insertion of the support rods into the mica spacers customarily placed about the finished grid electrodes for their mounting in electronic tubes.

Referring again to FIG. 3, means for removal of the completed and severed grid electrode are shown. These means comprise an air suction tube 144 inserted within spindle 35 and passing over the projecting end of grid electrode strip 5. The means used for applying a vacuum through tube 144 to remove a finished and severed grid electrode from spindle 35 are of conventional and well-known construction, and are not shown. Tube 144 is secured against rotation relative to housing 16 by means of a collar 145 placed thereabout and axially abutting castellated nut 57, and a set pin 146 radially passing through collar 144 into a depression 147 formed on the surface of tube 144. Set pin 146 is secured against rotation relative to housing 16 by means of a strap 148 secured at one end to housing 16 by means of machine screw 149, and formed at the other end with an opening 150 receiving the outer end of the set pin. The application of vacuum through tube 144 to remove a finished and severed grid electrode also serves to remove chip 143 from the upper end of stripper bar 136 after each severing operation.

Clamping head

The second clamping head 13 and its housing 15 are shown in detail in FIGURES 7, 8, and 9. Clamping head 13 serves only to clamp and not to sever grid electrode strip 5. The elements cooperating with clamping head 13 and housing 15 to transmit reciprocatory motion of push-rod 19 to the clamping head and housing, to transmit the rotary motion of spline shaft 21 to the clamping head, and to support housing 15 for reciprocatory motion on slide bars 17, are substantially identical with those previously described in connection with the first clamping head 14. For this reason those elements in FIGURES 7, 8, and 9 which are substantially identical with the elements of FIGURES 2, 3, and 4 have been correspondingly numbered, with prime superscripts. It is believed that these elements have been adequately described in connection with clamping head 14, and that no further description is necessary. Furthermore, the means driving the clamping jaws of clamping head 13, including a collar 98' and a yoke 112', are substantially identical with those associated with clamping head 14; therefore, the elements of this linkage have been correspondingly numbered with prime superscripts, and will not be further described.

Housing 15 is shown as being of somewhat lighter construction than housing 16, inasmuch as it serves only a clamping function and is therefore subject to lesser stresses than those occurring on housing 16. The provisions made in housing 15 for the elements cooperating with the housing and the associated clamping head are otherwise identical with those of housing 16, with the exception that pneumatic motors of somewhat different construction are employed. These motors require only a single compressed air supply conduit 29, rather than the dual conduits 30 and 31 of housing 16. These modifications will be described in detail hereinafter.

Referring to FIG. 8, the body of clamping head 13 is formed similarly to that of clamping head 14, including a bore 40' cooperating with an end portion 39' of hollow spindle 35', and suitable recesses 90' and 91' for receiving the toggle levers 86' and 87', respectively. However, clamping head 13 is formed with only a single diametral slot 160. Slot 160 receives a pair of clamping jaws 161 and 162 in radially slidable engagement therein. Jaws 161 and 162 are formed with circular openings 163 and 164, respectively, located near their outer extremities, for cooperation with ball joints 88' and 89', in a manner identical with that of the clamping jaws and toggle levers of clamping head 14. Jaws 161 and 162 are employed only for clamping grid electrode strip 5, and are formed of simple one piece construction, with serrated clamping edges 165 and 166, respectively, at their leading edges.

In order to receive grid electrode strip 5 along the rotational axis of head 13, face 127' of head 13 is formed with a central opening 125', and a guide collar 126' is affixed thereto in axially abutting relation by means of cap screws 128'. In use, grid electrode strip 5 passes entirely through spindle 35' along the rotational axis thereof, and is positioned to be clamped by movement of jaws 161 and 162 toward this axis.

As previously pointed out, the function of clamping head 13 merely to clamp the grid electrode permits a lighter construction of housing 15 than is permissible for housing 16. For the same reason, it is unnecessary to employ double acting pneumatic motors, such as motors 101 and 102 used to actuate clamping head 14. Single acting motors generally designated 170 and 171 are employed, which require only a single compressed air supply conduit 29, best seen in FIG. 7. Motors 170 and 171 each include a cylinder 172 formed in the body of housing 15. These cylinders are connected with conduit 29 by means of conduits 29a and 29b formed in the body of housing 15. Conduit 29 is threadly connected to housing 15 in communication with conduit 29a by means of a standard fitting 174.

One of the motors 170 is shown in detail in FIG. 9. A cylinder liner 175 is received in peripheral engagement within cylinder 172, and receives a piston 176 in axially slidable engagement therewith. The cylinder is sealed by means of cylinder heads 177 and 178 inserted and suitably secured within the ends thereof. A piston rod 179 is received within a central bore 176a formed in piston 176 axially of cylinder 172, and is secured therein by means of a pin 180 transfixing piston rod 179 and an integral collar 181 formed on piston 176. An O-ring 182 of resilient material is glued or otherwise suitably affixed in axial abutment to the face of piston 176 adjacent the periphery thereof, to prevent leakage of air past the piston. Cylinder head 178 is formed with a central opening 183 receiving piston rod 179 therethrough, and is provided with an annular seal 184 of resilient material to prevent leakage of air therethrough.

As previously explained, compressed air for operation of motor 170 is supplied through conduits 29, 29a, and 29b to cylinder 172. Further passages 29c and 29d are formed in cylinder head 177 to connect passage 29b with the portion of cylinder 172 enclosed by cylinder head 177 and piston 176. By admission of compressed air to motor 170 from conduit 29, piston 176 and piston rod 179 are thus driven in the direction of arrow D. Return of the piston and piston rod to the positions of FIG. 9 upon release of air pressure from conduit 29 is accomplished by means of a compression spring 185, which is interposed between piston 176 and cylinder head 178.

Yoke 112' is coupled to piston rod 179 by means of nuts 186 and 187, which are screwed on a threaded end 188 of piston rod 179. Yoke 112' is formed with a circular opening 189 received by an annular neck 190 formed on nut 186, and is secured thereon by means of nut 187. Yoke 112' is similarly drivingly connected with motor 171, so that both motors cooperate to reciprocate the yoke and to operate clamping jaws 161 and 162, through the linkage previously described.

It will be apparent that jaws 161 and 162 may be actuated by the means just described, to clamp grid electrode strip 5, by supplying compressed air to conduit 29, and that the jaws may be unclamped by stopping the air supply.

Air supply control means

As previously described, the clamping jaws of clamping head 14 may be actuated into clamping engagement with grid electrode strip 5 by compressed air supply to conduit 31, and may be unclamped by compressed air supplied to conduit 30. It has also been explained that the clamping jaws of clamping head 14 may be actuated to sever the grid electrode strip by supplying compressed air of increased pressure to conduit 31. Similarly, it has been described that compressed air may be supplied to conduit 29 to clamp the jaws of clamping head 13 on the grid electrode strip, and that these jaws may be unclamped by stopping the supply of compressed air thereto. Referring to FIG. 10, means are shown for controlling the supply of compressed air through conduits 29, 30, and 31, in order to actuate the clamping jaws of clamping heads 13 and 14 in accordance with a predetermined program of operation of the grid-making machine, and specifically in synchronism with the reciprocation of clamping heads 13 and 14.

Conduits 29, 30, and 31 are supplied by compressed air supply means schematically shown at 28. Supply means 28 includes three distributing valves 200, 201, and 202 for selectively distributing compressed air to conduits 29, 30, and 31. These valves are of a widely used commercially available type, and include an inlet port 203 for admitting compressed air to the valve, outlet ports 204 and 205 which are alternatively connected to inlet port 203, and exhaust ports 206 and 207. When one of the ports 204 or 205 is connected to port 203, the other is connected to one of exhaust ports 206 or 207, respectively. The valves are each actuated to either of the two alternative positions by means of solenoid actuators A1, A2, A3, A4, A5 and A6, one of which is affixed to each end of one of the valve bodies, and which are effective to actuate the valve upon a momentary electrical energization through a contact 208 associated therewith. The energizing circuit for each actuator includes a ground 210 to complete the energizing circuit. Such valves are of a type well known in the art, and it is believed unnecessary to give a detailed description of their construction and operation.

Compressed air is supplied to valves 200, 201, and 202 by a conduit 211, supplied with compressed air from any suitable source at a pressure P1, which must be sufficiently greater than atmospheric pressures to actuate motors 101 and 102 with sufficient force to sever grid electrode strip 5 through the medium of the clamping jaws of clamping head 14. Conduit 211 is connected to inlet ports 203 of valves 200, 201 and 202 by means of branch conduits 212, 213, and 214, respectively. Suitable pressure-reducing regulators 215 and 216 are interposed in conduits 212 and 213, respectively, and serve to reduce the pressure of the air supplied to valves 200 and 201 to a pressure P2, which is only sufficiently greater than atmospheric pressure to actuate motors 101, 102, 170, and 171 to clamp, but not to sever, grid electrode strip 5, through the medium of the jaws of clamping heads 13 and 14.

Conduit 29, which supplies air to motors 170 and 171, is connected to an outlet port 204 of valve 201, which serves to selectively admit air at pressure P2 to this conduit. The second outlet port 205 of valve 201 is not used, and may be blocked off.

Conduit 31, which serves to admit air to motors 101 and 102 to actuate the jaws of clamping head 14, is connected by a branch conduit 31d to outlet port 205 of valve 200, which may be selectively actuated to admit air at pressure P2 to this conduit. Conduit 31 is also connected, by a second branch conduit 31e, to outlet port 204 of valve 202, which may be selectively actuated to admit air at pressure P1 to this conduit. This second outlet port 205 of valve 202 is not used, and may be blocked off.

Conduit 30, which serves to admit air to motors 101 and 102 to withdraw the clamping jaws of clamping head 14 from engagement with grid electrode strip 5, is connected to outlet port 204 of valve 200, which may be selectively actuated to admit air at pressure P2 to this conduit.

Means are provided for selectively energizing actuators A1–A6, in order to control air supply means 28 in accordance with a program of actuation of the jaws of clamping heads 13 and 14 synchronized with other operations of the grid-making machine, and specifically with reciprocation of heads 13 and 14. These control means include switches S1, S2, S3, S4, S5, and S6, which are included in electrical circuits energizing actuators A1–A6. The energization circuits include conductors L1, L2, L3, L4, L5, and L6, each respectively electrically connected to electrical contacts 208 of one of the actuators A1–A6. Each of conductors L1–L6 is respectively electrically connected to one of stationary contacts 220, each comprising one of the contacts of each of the switches S1, S2, S3, S4, and S5, and S6, respectively. Each of switches S1–S6 includes a resilient leaf contact 221, supported at an end 222 by means of a stationary support 223 affixed thereto. Leaf contact 221 may be brought into electrical conducting engagement with contact 220 by movement of an insulating knob 224 affixed to an end of the leaf contact. Each of leaf contacts 221 is energized by a suitable source of electrical current 225, by means of a conductor L7 conductively affixed to each of leaf contacts 221. Thus, it will be apparent that movement of any of knobs 224 of switches S1–S6 to close leaf contact 221 and contact 220 of that switch will energize the corresponding one of actuators A1–A6 through the line L1–L6 associated therewith.

Means are provided for actuating switches S1–S6 in accordance with a predetermined program, comprising a group of cams C1, C2, C3, C4, C5, and C6, which are suitably secured for rotation on a cam shaft 226. Cam shaft 226 is driven in the direction shown by the arrow by speed reducer 27, which, as has previously been described, is driven by jack shaft 26a from drive shaft 7 of the grid-making machine. Each of cams C1–C6 is provided with an ear 227, which upon rotation of that cam through a complete revolution will close switch contacts 220 and 221 of the associated switch, by displacing knob 224 and leaf contact 221 into circuit-closing position. Although the switch closure is momentary, the resulting energization of that one of the actuators A1–A6 associated with that switch will operate its associated valve 200, 201, or 202, and the resulting condition of that valve will be maintained until such time as the other one of actuators A1–A6 associated with that valve is energized to alter it. Thus, a complete cycle of operation of the valves is carried out during each revolution of camshaft 226. In FIG. 10, the cams are shown in relative position such as to actuate switches S1–S6 and actuators A1–A6 in the sequence of their numbers.

The following sequence of events will occur during each revolution of shaft 226, with the cams C1–C6 arranged as shown, and assuming that the jaws of clamping head 13 are initially clamped, air at pressure P2 being supplied to motors 170 and 171 through conduit 29 by valve 201; that the clamping jaws of head 14 are unclamped by motors 101 and 102, air being supplied thereto at a pressure P2 through conduit 30 by valve 200; and that conduits 31d, 31e and 31 are open to the atmosphere through valves 200 and 202. As camshaft 226 rotates in the direction of the arrow, cam C1 energizes actuator A1 of valve 200 through switch S1 and line L1 to admit air at pressure P2 to conduits 31d and 31, and to open conduit 30 to atmosphere, thus actuating motors 101 and 102 to clamp the jaws of head 14 on grid electrode strip 5. Cam C2 energizes actuator A2 of valve 201 through switch S2 and line L2 to exhaust conduit 29 to atmosphere, whereby springs 185 of motors 170 and 171 actuate the jaws of clamping head 13 to an unclamped position. Cam C3 energizes actuator A3 of valve 201 through switch S3 and line L3 to admit air at pressure P2 to conduit 29, thus actuating motors 170 and 171 to reclamp the clamping jaws of head 13. Cam C4 energizes actuator A4 of valve 202 through switch S4 and line L4 to admit air at pressure P1 to conduits 31e and 31, causing motors 101 and 102 to further actuate the jaws of clamping head 14 to sever grid electrode strip 5. Cam C5 energizes actuator A5 of valve 202 through switch S5 and line L5 to exhaust conduits 31e and 31 to atmosphere, also exhausting air from conduit 31d at pressure P2 to atmosphere. Cam C6 energizes actuator A6 of valve 200 through switch S6 and line L6 to admit air at pressure P2 to conduit 30, causing motors 101 and 102 to unclamp the jaws of clamping head 14, and also closes off the supply of air at pressure P2 to conduit 31d, which was previously exhausted through valve 202. The jaws of clamping heads 13 and 14 are thus returned to their initial positions.

The means just described mutually correlate the clamping and severing operations of the jaws of clamping heads 13 and 14 with the rotation of drive shaft 7, thus correlating them with the other operations of the grid-making machine, and specifically with the reciprocation of heads 13 and 14. The specific correlation of the program of operation of the clamping jaws with the program of reciprocation of heads 13 and 14 is achieved through the mutual operation of the clamping control means just described and the motion box 25 by jack shaft 26a, which drives both of these devices. This correlation will be described in connection with FIG. 12, following a detailed description of motion-box 25.

*Motion-box*

As previously described, housings 15 and 16 are connected for reciprocation on slide bars 17 by push-rods 19 and 20, respectively. Reciprocation of push-rods 19 and 20 is achieved by means of motion-box 25, shown in FIG. 11, which includes a pair of cams 230 and 231. Jack shaft 26a revolves cam 230 by means of a worm gear 232. A shaft 234 is supported for rotation in suitable bearings (not shown), and cam 230 is mounted on shaft 234 for rotation therewith, and is secured thereto by means of a key 235. Similarly, cam 231 is driven from jack shaft 26a by means of a worm gear 236 secured to the jack shaft, and a gear 237 supported in driven relation therewith by a shaft 238 rotatably mounted in suitable bearings (not shown). Cam 231 is secured to shaft 238 by means of a key 239. The rotation of jack shaft 26a, and the resulting rotation of cams 230 and 231, is in the direction of the arrows in FIG. 11. A dog 231a is adjustably affixed to the periphery of cam 231 by means of a machine screw 231b, threaded into cam 231 through a slot 231c formed in the dog. Dog 231a projects beyond the periphery of cam 231, and is positioned to present an increasing radius in a peripheral direction opposite to the direction of rotation of cam 231. The forms to be given cams 230 and 231, and the function of dog 231a, will be described in detail in connection with FIG. 12.

Means for translating the rotational motion of the cams into reciprocatory rectilinear motion of push-rods 19 and 20 are provided, generally comprising rocker arms 240 and 241, and cam followers 242 and 243. Rocker arms 240 and 241 are received within slots 244 and 245, respectively, formed in the adjacent ends of push-rods 19 and 20, and are pivotally secured therein by means of transverse pins 246 and 247. The rocker arms are also formed with slots 248 and 249, respectively, receiving slide members 250 and 251. The rocker arms and their associated slide members are rotatable about a pair of rock shafts 252 and 253, which transfix slide members 250 and 251, respectively, and are pivotally secured thereto. Linear reciprocation of push-rods 19 and 20 during the oscillation of rocker arms 240 and 241 about rock shafts 252 and 253 is accommodated by sliding motion of slide members 250 and 251 in slots 248 and 249, respectively.

As previously stated, cam followers 242 and 243 are provided to translate the rotary motion of cams 230 and 231 into rectilinear movement of the push-rods. The cam followers are mounted to translate rotary motion of the cams into oscillatory motion of the rocker arms, by means which permit movement of the cam followers only along straight-line paths radial to the axes of rotation of the cams. It will be apparent that if the cam followers were permitted to follow an oscillatory path with the rocker arms, the pattern of motion established by the forms of the cams would be distorted in translation. The means for mounting cam followers 242 and 243 includes slide members 254 and 255, which are mounted for linear sliding motion in slides 256 and 257, respectively, these slides forming a stationary part of the grid-making machine. Cam followers 242 and 243 are rotatably mounted on slide members 254 and 255, respectively, by means of pins 258 and 259, suitably affixed to the slide members. Reciprocating rectilinear motion of slide members 254 and 255 is translated into oscillatory motion of rocker arms 240 and 241 by means of shafts 260 and 261 transfixing the slide members and secured thereto by means of nuts 262 and 263, respectively. In order to accommodate the oscillatory movement of the rocker arms and rectilinear motion of the slide members, transmission of motion from shafts 260 and 261 to the rocker arms is achieved by followers 264 and 265 rotatably secured to the ends of shafts 260 and 261, respectively, and slidable in slots 266 and 267 formed in rocker arms 240 and 241, respectively.

It will be readily apparent that the linear rates of motion of the push rods relative to those of cam followers 242 and 243 will be substantially in inverse proportion to the distance between pins 246 or 247 and rock shaft 252 or 253, respectively, and the distance between rock shaft 252 or 253 and shaft 260 or 261, respectively, as modified by the sliding movements of the followers and slide members in the slots formed in the rocker arms. Means are provided for adjusting the positions of rock shafts 252 and 253 in slots 248 and 249, respectively, so that the lengths of the paths of reciprocatory motion of push-rods 19 and 20 relative to those of cam followers 242 and 243, respectively, during a complete revolution of cams 230 and 231, may be varied. This adjustment permits a pre-selection of the length of completed grid electrodes produced by the grid-making machine, as will become apparent from the description of FIG. 12 hereinafter. The adjusting means generally comprises a slide member 268 received in vertical sliding engagement by a slide groove 269 suitably formed in a stationary portion 270 of the grid-making machine. Sliding movement of slide member 268 in groove 269 is limited to a fixed travel by means of a bolt 271 transfixing slide member 268 and passing through a groove 273 formed in stationary portion 270. Bolt 271 is secured in groove 273 by a nut 272 threaded thereon. Rock shafts 252 and 253 are secured in parallel spaced-apart relation to slide member 268, perpendicular to the plane of sliding motion of the slide member, by any suitable means (not shown). The position of slide member 268 in groove 269 is adjustably established by means of a jack screw 274, which is threaded into a threaded hole 275 formed in the slide member, and is secured therein by means of a set screw 276 threaded in the slide member. Jack screw 274 is selectively vertically adjusted and secured by means of a crank member 277 formed with a threaded bore 278 cooperating in threaded engagement with jack screw 274. In order to hold crank member 277 in a vertically stationary position, a plate-like stationary portion 280 of the grid-making machine is formed with a bore 281 rotatably receiving a necked-down end portion 282 of the crank member. The crank member is secured against separation from stationary portion 280 by means of a collar 283, brazed or otherwise suitably secured about the portion of the crank member extending above stationary portion 280. Adjustment of jack screw 274 is achieved by rotating crank member 277 by means of a handle 284 suitably secured to an annular flange 279 formed on the crank member. By these means, the vertical positions of rock shafts 252 and 253 may be adjustably established to give a desired length to the path of linear reciprocation of push-rods 19 and 20 during a complete revolution of cams 230 and 231.

As previously described in connection with FIG. 10, the jaws of clamping heads 13 and 14 perform a complete cycle of clamping and severing operations during each revolution of cam shaft 226, driven by jack shaft 26a. Similarly, clamping heads 13 and 14 and housings 15 and 16 perform a complete cycle of reciprocatory motion during each revolution of cams 230 and 231, also driven by jack shaft 26a. In order to correlate the clamping, severing, and reciprocating operations, gears 232, 233, 236, and 237 should be so selected as to produce a single complete revolution of cams 230 and 231 during each complete revolution of camshaft 226. These gears must, therefore, be selected with regard to the selection of speed reducer 27.

As previously generally described, a pair of pneumatic dashpots 19a and 20a are affixed to push-rods 19 and 20, respectively, and are mounted on bed plate 1 by any suitable means (not shown). Compressed air is supplied to the dashpots through conduits 19b and 20b, respectively, from any suitable source of supply (not shown). It is the function of the dashpots to resiliently bias the push-rods in directions to maintain followers 242 and 243 in contact with the peripheries of cams 230 and 231, respectively, in order that the reciprocatory motions of clamping heads 13 and 14 will be faithfully controlled by the contours of the cams.

Operation

The foregoing description has explained the construction and operation of the elements producing controlled reciprocation of clamping heads 13 and 14, and correlated controlled movement of their associated jaws to clamp and to sever grid electrode strip 5. Referring to FIG. 12, the program of correlated operation of these devices to secure the objectives of the invention will be described.

In FIGS. 12A, 12B, 12C, and 12D, clamping heads 13 and 14 and cams 230 and 231, together with fragmentary portions of their associated elements, are shown in four operational stages of a complete cycle of their program of actuation. Cam followers 242 and 243 are shown in positions relative to cams 230 and 231 corresponding to the positions of heads 13 and 14 shown in each view. These cams rotate in the directions of the arrows. The portions of cams 230 and 231 defined by the radial lines, lettered $a$–$m$, indicate the phases of operation of the cams just completed when the followers are in the position shown. It will be recalled that the movements of clamping heads 13 and 14 in accordance with the contours of cams 230 and 231 is achieved by the cooperation therewith of dashpots 19a and 20a, respectively.

As has been previously described, the program of actuation of clamping jaws 82, 83, 161, and 162 is controlled by the pre-established relative positions of cams C1–C6 on shaft 226; the precise angular relationship of these cams is established in such a manner as to actuate the clamping jaws in correlation with the stages of operation of cams 230 and 231, to produce the sequence of actuation of the clamping jaws and reciprocation of the clamping heads now to be described.

As previously explained, clamping heads 13 and 14 centrally receive grid electrode strip 5 of indefinite length. Grid electrode strip 5 consists of a series of individually wound grid electrodes, of which one is indicated at 5'. Referring to FIG. 12A, and assuming that the operations are beginning at line $a$ on cam 230 and line $e$ on cam 231, that jaws 161 and 162 are initially clamped on grid electrode strip 5 between individual grid electrodes, and that jaws 82 and 83 are initially unclamped, the following events will occur during the rotation of the cams through shaded portion $a$–$b$ and $e$–$g$. Cam 230, which is formed with a constantly decreasing radius from line $a$ to line $b$, will move clamping head 13 in the direction of arrow F, feeding grid electrode strip 5 by means of the clamping engagement of jaws 161 and 162 therewith. At the same time, cam 231, which is of constant radius between lines $e$–$f$, will not produce movement of head 14; that is, head 14 will dwell in a fixed position. When cam follower 243 reaches line $f$, cam C1 is positioned on shaft 226 to clamp jaws 82 and 83 of clamping head 14 on grid electrode strip 5 between adjacent grids 5'. As cam follower 243 moves from line $f$ to line $g$, cam 231, which has a steadily increasing radius between these points, will cause movement of clamping head 14 in the direction of arrow F, producing a feeding of grid electrode strip 5 in this direction, in conjunction with clamping head 13. As follower 242 reaches line $b$ on cam 230, cam C2 is positioned to act to unclamp jaws 161 and 162 of clamping head 13 from the grid electrode strip.

Referring to FIG. 12B, as follower 243 moves from line $g$ to line $h$, cam 231, which has a constantly increasing radius between these lines, will continue to move head 14 in the direction of arrow F, thus continuing the constant feeding of grid electrode strip 5 in this direction. Cam 230, which has an increasing radius from line $b$ to line $c$, will reverse the previous direction of movement of head 13 during this stage, moving it oppositely to the feeding direction F of grid electrode strip 5. As follower 242 reaches line $c$, cam C3 is positioned to act to re-clamp jaws 161 and 162 of clamping head 13 on grid electrode strip 5 between adjacent grids 5'.

Referring to FIG. 12C, cam 230, which has a constantly decreasing radius from line $c$ to line $d$, will move clamping head 13 in the direction of arrow F during this stage, thus feeding grid electrode strip 5 by means of jaws 161 and 162 clamped thereon. As cam follower 243 passes from line $h$ to line $j$ on cam 231, this cam, which has a steadily increasing radius between these lines, will continue to move clamping head 14 in the direction of arrow F, feeding grid electrode strip 5 in conjunction with clamping head 13. As it passes line $j$ on cam 231, cam follower 243 rides onto dog 231a of increased radius, so that head 14 is abruptly jerked to the right. This abrupt movement of head 14 to the right occurs at a greater speed than the continued feeding movement of head 13, and so produces a stretching of the portion of grid electrode strip 5 clamped between jaws 161 and 162, and jaws 82 and 83. As follower 243 passes line $j$ and traverses dog 231a, cam C4 is positioned to act to cause motors 101 and 102 to increase the clamping pressure of jaws 82 and 83 sufficiently to cut off grid electrode strip 5, thus severing an individual grid 5', which may be removed from clamping head 14 and housing 16 by vacuum tube 144, previously described. As follower 243 traverses to line $k$, the increasing radius of dog 231a continues the feeding of head 14 at the same speed as the feed of grid electrode strip 5 by head 13, so as to avoid interference between these elements. As follower 243 approaches line $k$, cams C5 and C6 are positioned to act sequentially to reverse motors 101 and 102 to unclamp the jaws of clamping head 14.

Referring to FIG. 12D, cam 230, which exhibits a constant decrease in radius from line $d$ to line $a$, continues to produce feeding motion of head 13 in the direction of arrow F, feeding the grid electrode strip in this direction by means of jaws 161 and 162 clamped thereon. As follower 243 passes line $k$, it is returned to the surface of cam 231 from dog 231a, causing a slight reversal of head 14, opposite to the direction of arrow F. Cam 231, which exhibits a constant radius between line $k$, and line $m$, will not produce motion of head 14 while follower 243 traverses this portion of the cam; that is, head 14 will dwell at this time. As follower 243 passes from line $m$ to line $e$, cam 231, which has a steadily decreasing radius between these lines, will produce a reversing movement of clamping head 14 in a direction opposite to that of arrow F, thus returning head 14 to the initial position of FIG. 12A. At the completion of this program of operations, the elements are in the condition shown in FIG. 12A, ready to repeat the cycle.

It will be readily apparent that the clamping heads and their associated jaws, the cam-controlled motion-box 25, the clamping air supply means 28 and its control circuits, and their mutual driving means, cooperate in a program of actuation which is operative to continually feed, stretch, and sever finished grid electrodes from grid electrode strip 5.

As has previously been described, clamping heads 13 and 14 are rotated at a constant speed by spline shaft 21, so that the clamping heads rotate in unison with the rotation of grid electrode strip 5 produced by the grid-making devices 4 of the grid-making machine. Thus, the initial positioning of grid electrode strip 5 relative to the clamping jaws is maintained. The initial positioning should be such that the parallel support rods of grid electrode strip 5 lie on a plane perpendicular to the paths of sliding motion of the clamping jaws. The maintenance of this relationship during the rotation of the grid electrode strip and the heads insures that the clamping jaws will operate upon the support rods without distorting them.

It will also be apparent that the lengths of the paths of reciprocatory motion of heads 13 and 14 are to be established, by the adjusting means of motion-box 25, to be equal to the length of a finished grid electrode 5', so that the clamping and cutting operations will take place on the support rods at correct positions intermediate grids 5'.

The number of turns of fine wire per unit length of support rod of the finished grid electrodes is determined by the rate of feed of the support rods through the grid-forming devices 4 of the grid-making machine. Thus, the number of turns per unit length of the completed grids may be varied in any desired manner by suitably varying the rate of change of the radii of cams 230 and 231 over the feeding portions thereof. If it is desired to produce grid electrodes having a constant number of turns of fine wire per unit length, cams 230 and 231 are formed with uniform rates of change of radius over the feeding portions thereof, so as to feed the grid electrode strip at a uniform rate.

It will be obvious to those skilled in the art that although the embodiment of the invention herein shown and described is adapted for use with a grid electrode strip having two parallel support rods, it may be used equally well with a grid electrode strip having only one support rod; and that the clamping heads may be modified by the addition of an appropriate number of diametral slots and jaws, properly angularly spaced about the heads, to accommodate grid electrode strips having a greater number of parallel support rods.

It should be understood that the invention is not limited to specific details of construction and arrangement thereof herein illustrated, and that changes and modifications may occur to one skilled in the art without departing from the spirit and scope of the invention.

What we claim as new and desire to secure by Letters Patent is:

1. For use in a machine for making grid electrodes of the type comprising parallel support rods and a helix of wire wound thereabout; a continuous feeding device for grid electrodes of indefinite length comprising, in combination; a first and second head; means supporting said heads for combined continuous rotation about, and reciprocatory movement along, a common axis; driving means for continuously rotating said heads; said heads formed with openings for receiving a grid electrode along said axis; first and second pairs of clamping jaws for said first and said second heads, respectively, said jaws radially slidable in said heads perpendicular to said axis; actuating means for selectively sliding said clamping jaws into clamping engagement with said grid electrode; control means for said actuating means; and cam-controlled means for producing selective reciprocatory movement of said heads conjointly with the rotation thereof and along said axis; said driving means driving said control means and said cam-controlled means in synchronism to effect progressive movement of said indefinite length of grid electrode along said common axis.

2. For use in a machine for making grid electrodes of the type comprising parallel support rods and a helix of wire wound thereabout; a continuous feeding device for grid electrodes of indefinite length comprising, in combination; a first and a second head; means for supporting said heads for combined continuous rotation about, and reciprocatory movement along, a common axis; driving means for rotating said heads; said heads formed with openings for receiving a grid electrode along said axis; first and second pairs of clamping jaws for said first and said second heads, respectively, said jaws radially slidable in said heads with respect to said axis; actuating means for selectively sliding each of said clamping jaws into clamping engagement, and also to actuate said first clamping jaws into severing engagement, with said grid electrode; control means for said actuating means; and cam-controlled means for producing selective reciprocatory movement of said heads along said axis; said control means and said cam-controlled means being driven in synchronism by said driving means to energize said actuating means for controlling the movement of said jaws and to effect reciprocating movement of said heads, thereby to separate from said indefinite length of grid electrode sections of electrode of predetermined fixed lengths.

3. For use in a machine for making grid electrodes of the type comprising parallel support rods and a helix of wire wound thereabout; a continuous feeding device for grid electrodes of indefinite length comprising, in combination; a first and a second head, each formed to receive a length of grid therethrough; means for supporting said heads for continuous synchronous rotation about, and translation along, a common axis; driving means for rotating said heads; first and second pairs of clamping jaws for said first and said second head, respectively, said jaws radially slidable in said heads with respect to said axis; actuating means for selectively sliding each of said pair of clamping jaws into clamping engagement, and said first pair of jaws independently into severing engagement, with said length of grid; control means for said actuating means; and cam-controlled means for producing selective reciprocatory movement of said heads along said axis; said control means and said cam-controlled means being driven in synchronism by said driving means to sequentially and cyclically cause feeding and clamping engagement of said jaws on said grid electrode in an initial portion of a cycle of operation, said cam-controlled means comprising an element for producing feeding movement of said first head concurrently with, but at a greater velocity than the continued feeding movement of said second head in another portion of a cycle of operation to cause stretching of said length of grid.

4. For use in a machine for making grid electrodes of the type comprising parallel support rods and a helix of wire wound thereabout; a continuous feeding device for a grid electrode of indefinite length comprising, in combination; a first and a second head; first and second housing means for supporting said heads, respectively, for rotation about a common axis, said housing means supported for reciprocatory movement of said heads along said axis; driving means for rotating said heads; said heads formed with openings for receiving a grid electrode along said axis; first and second pairs of clamping jaws for said first and said second heads, respectively, said jaws radially slidable in said heads with respect to said axis; first and second fluid-operated actuating means drivingly connected with said first and said second jaws; respectively, for selectively sliding said jaws into clamping engagement with said grid electrode; electric circuit control means; connected to control operation of said fluid-operated actuating means; rotary switch means; means connecting said switch means for selectively actuating said electric circuit control means; and cam-controlled linkage means for producing selective reciprocatory movement of said heads along said axis; and means coupling said rotary switch means and said cam-controlled means to said driving means for synchronous operation thereby.

5. The combination recited in claim 4, in which said first and said second fluid-operated actuated means are affixed to said first and said second housing means, respectively, together with first and second linkage means drivingly connecting said first and said second actuating means with said first and said second pairs of jaws, respectively; each of said linkage means comprising; a toggle linkage drivingly connected with one of said pairs of jaws for rotation with a corresponding one of said heads, a collar drivingly connected with said toggle linkage for rotation with said head, a yoke member drivingly connected with a corresponding one of said actuating means, and bearing means for transmitting purely rectilinear motion of said yoke member into rectilinear motion of said rotating collar.

6. For use in a machine for making grid electrodes of the type comprising parallel support rods and a helix of wire wound thereabout; a continuous feeding device for a grid electrode of indefinite length comprising, in combination; a first and a second head; bearing means for supporting said heads for rotation about a common axis, said bearing means supported by said machine for reciprocatory movement of said heads along said axis; driving means for rotating said heads; said heads formed with openings for receiving a grid electrode along said axis; first and second pairs of clamping jaws for said first and said second heads, respectively, said jaws radially slidable in said heads with respect to said axis; fluid-operated actuating means for selectively sliding said clamping jaws into clamping engagement, and said first pair of clamping jaws into severing engagement, with said grid electrode; electric circuit control means connected to control operation of said fluid-operated actuating means; rotary switch means; means connecting said switch means for selectively actuating said electric circuit control means; and cam-controlled linkage means for producing selective reciprocatory movement of said heads along said axis; means interconnecting said rotary switch means and said cam-controlled means to said driving means to be driven by the latter in synchronism to energize said actuating means for controlling the movement of said jaws and to effect reciprocating movement of said heads.

7. In a machine for making grid electrodes of the type comprising parallel support rods and a helix of wire wound thereabout; a feeding device for a grid electrode of indefinite length comprising, in combination; a first and a second head supported for movement along a predetermined axis; driving means adapted to drive said heads in reciprocation according to a predetermined time sequence; said heads formed with openings for receiving a grid electrode along said axis; first and second pairs of clamping jaws for said first and said second heads, respectively, said jaws radially slidable in said openings selectively to clamp said grid electrode only when said heads are simultaneously moving in the same direction; and means operable during a predetermined part of said sequence and while both said jaws are in electrode-clamping condition to increase the speed of reciprocation of one said head relative the other to effect stretching of the electrode portion between said jaws.

8. A head formed with a central opening for receiving a work member and with slots perpendicular to the longitudinal dimension of said member; clamping jaws slidable in said slots to clampingly engage said member; means supporting said head for rotation about said longitudinal dimension as an axis; fluid-operated motive means for said jaws; control means for selectively operating said motive means; and means drivingly connecting said motive means with said clamping jaws for actuating said jaws to clamp said member; said actuating means comprising linkages drivingly connected with said clamping jaws for rotation with said head, a collar drivingly connected with said linkages for rotation with said head, a yoke member drivingly connected with said motive means, and bearing means for transmitting purely rectilinear motion of said yoke member into rectilinear motion of said rotating collar.

9. For use in a machine for making grid electrodes of the type comprising parallel support rods and a helix of wire wound thereabout; a continuous feeding device for a grid electrode of indefinite length comprising, in combination; a first and a second head; first and second housing means for supporting said heads in spaced relationship for rotation about a common axis, said housing means supported for reciprocatory movement of said heads along said axis; driving means for rotating said heads; said heads formed with openings for receiving a grid electrode along said axis; first and second pairs of clamping jaws respectively slidable in said first and said second heads; first and second actuating means for selectively sliding said first and said second pairs of jaws, respectively, into clamping engagement with said grid electrode; means connected for controlling said actuating means; and cam-controlled means drivingly connected with said housings for reciprocation of said heads in mutually opposite directions along said axis; and said cam-controlled means being adapted to produce clamping of one of said first and said second pairs of jaws on said grid electrode only when a corresponding one of said heads is moving in a pre-selected feeding direction.

10. In a machine for making grid electrodes; a continuous feeding and intermittent cutting device; comprising a head supported for combined rotation and reciprocal movement along an axis; means for rotating said head; said head having an opening for receiving a grid electrode along said axis; a pair of clamping jaws slidable in said head adjacent said opening; pneumatic control means adapted to provide a source of commonly directed relatively low and high pressures; means responsive to relatively low air pressure from said pneumatic means for actuating said jaws into clamping engagement with said grid electrode and responsive to relatively increased air similarly directed pressure from said pneumatic means for actuating said jaws into electrode cutting engagement therewith, said pneumatic control means further comprising means to apply air pressure in a direction opposed to said relatively low and high pressures to cause disengagement of said jaws after said cutting engagement.

References Cited in the file of this patent

UNITED STATES PATENTS

| | | |
|---|---|---|
| 2,181,288 | Washburn | Nov. 28, 1939 |
| 2,480,677 | Sheffield | Aug. 30, 1949 |
| 2,717,092 | Gartner et al. | Sept. 6, 1955 |
| 2,759,499 | Gartner | Aug. 21, 1956 |

FOREIGN PATENTS

| | | |
|---|---|---|
| 476,513 | Canada | Aug. 28, 1951 |

Disclaimer 3,001,556.—*Marvin C. Eans, Jr.*, and *Junius B. Neale*, Owensboro, Ky. AUTOMATIC GRID MAKING MACHINE. Patent dated Sept. 26, 1961. Disclaimer filed July 22, 1963, by the assignee, *General Electric Company*.
Hereby enters this disclaimer to claims 1, 7, and 9 of said patent.
*[Official Gazette September 10, 1963]*